Sept. 13, 1966  C. J. CRETORS  3,272,111
CORN POPPER
Filed May 17, 1963  5 Sheets-Sheet 2
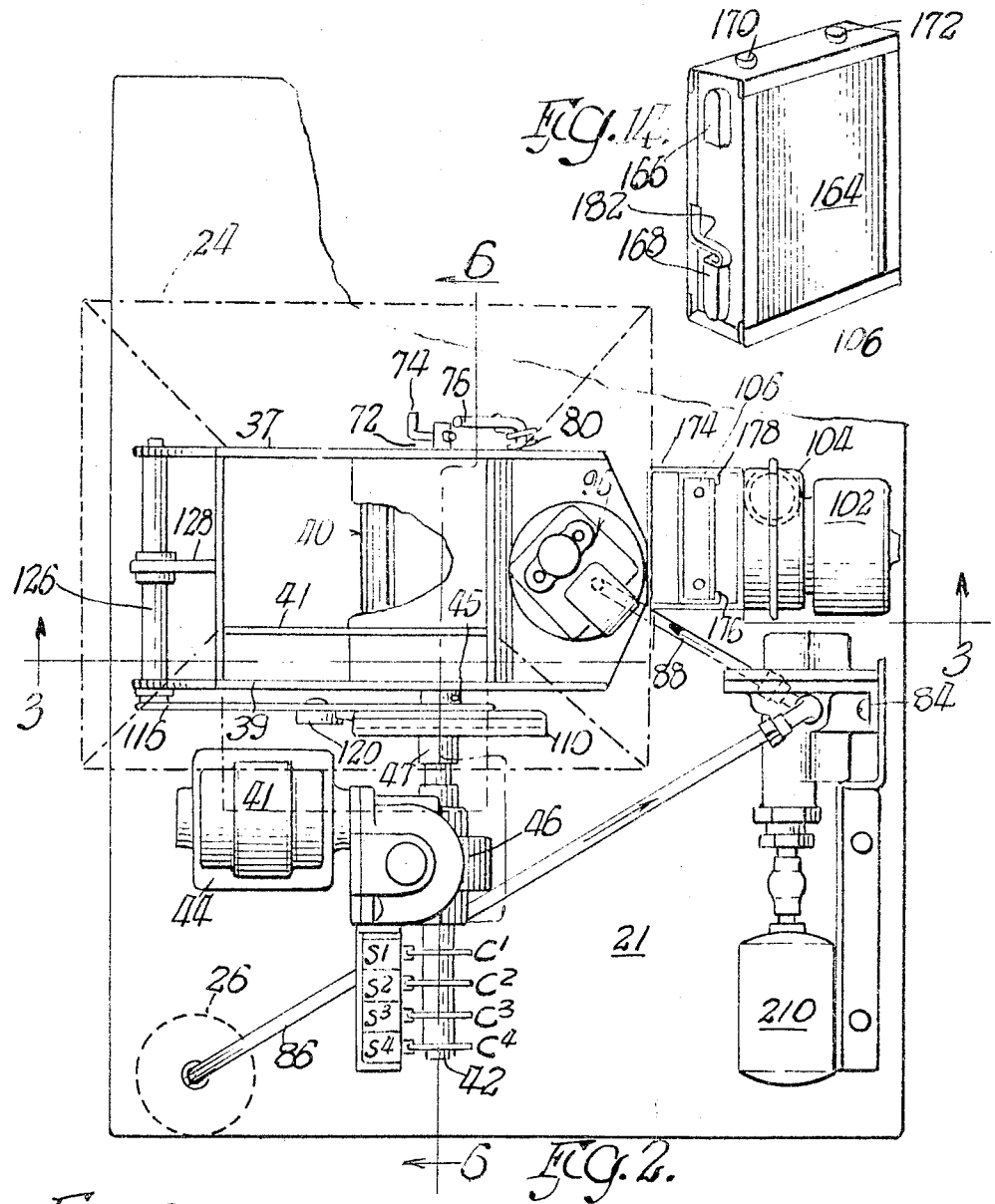
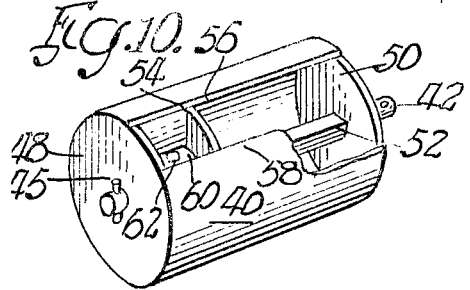
Inventor
Charles J. Cretors
by Pendleton, Neuman,
Seybold & Williams Attys

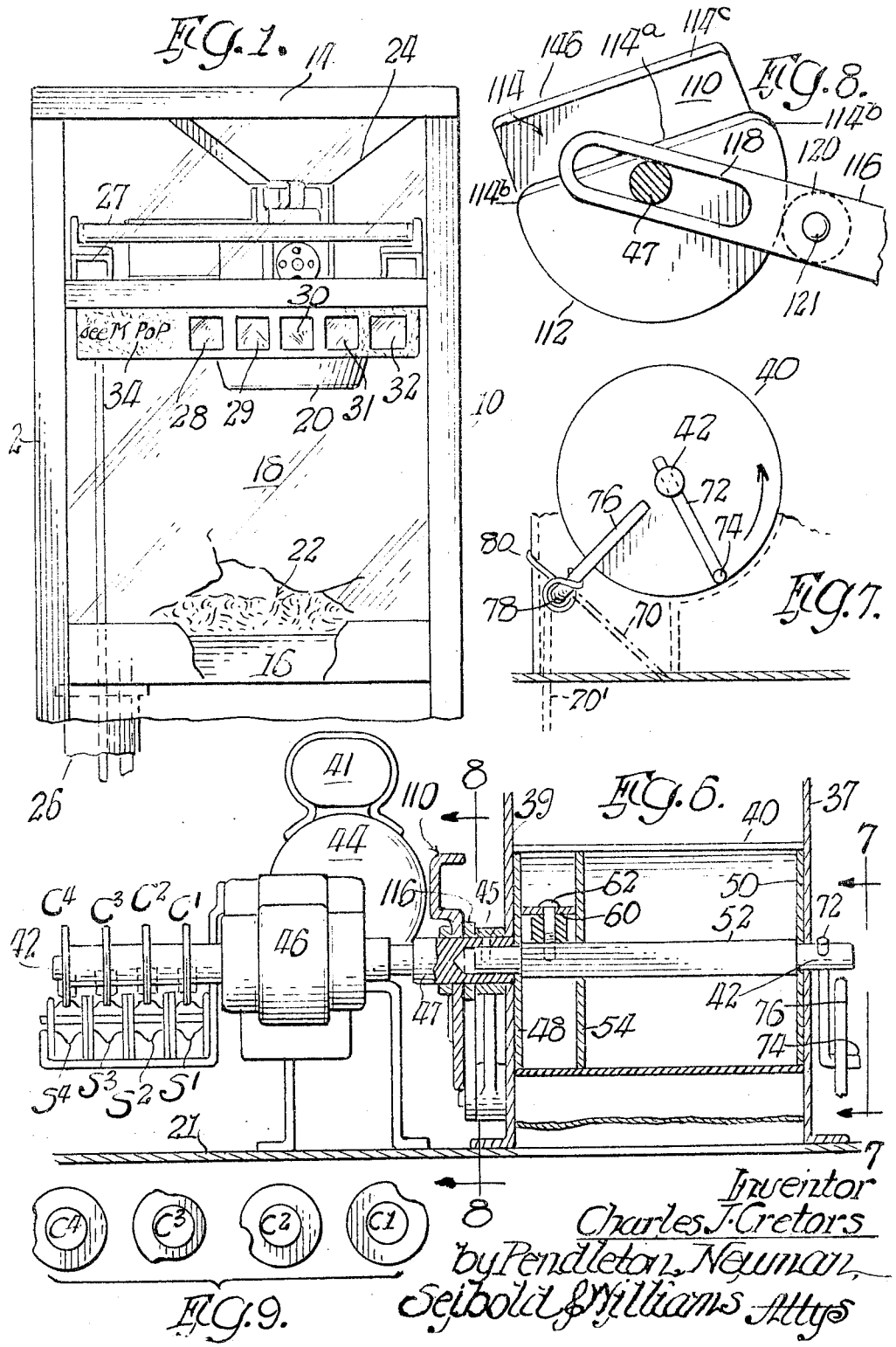

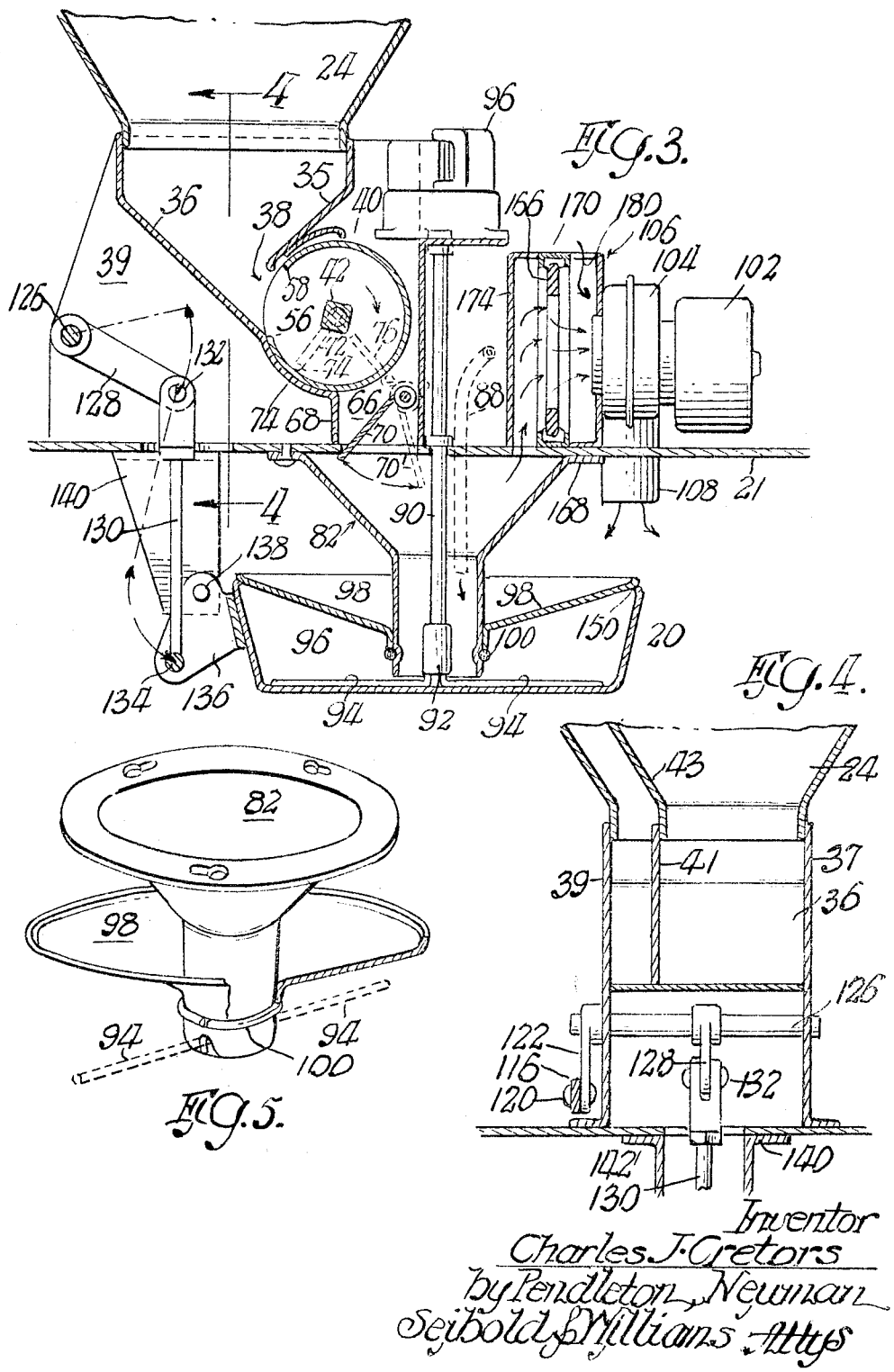

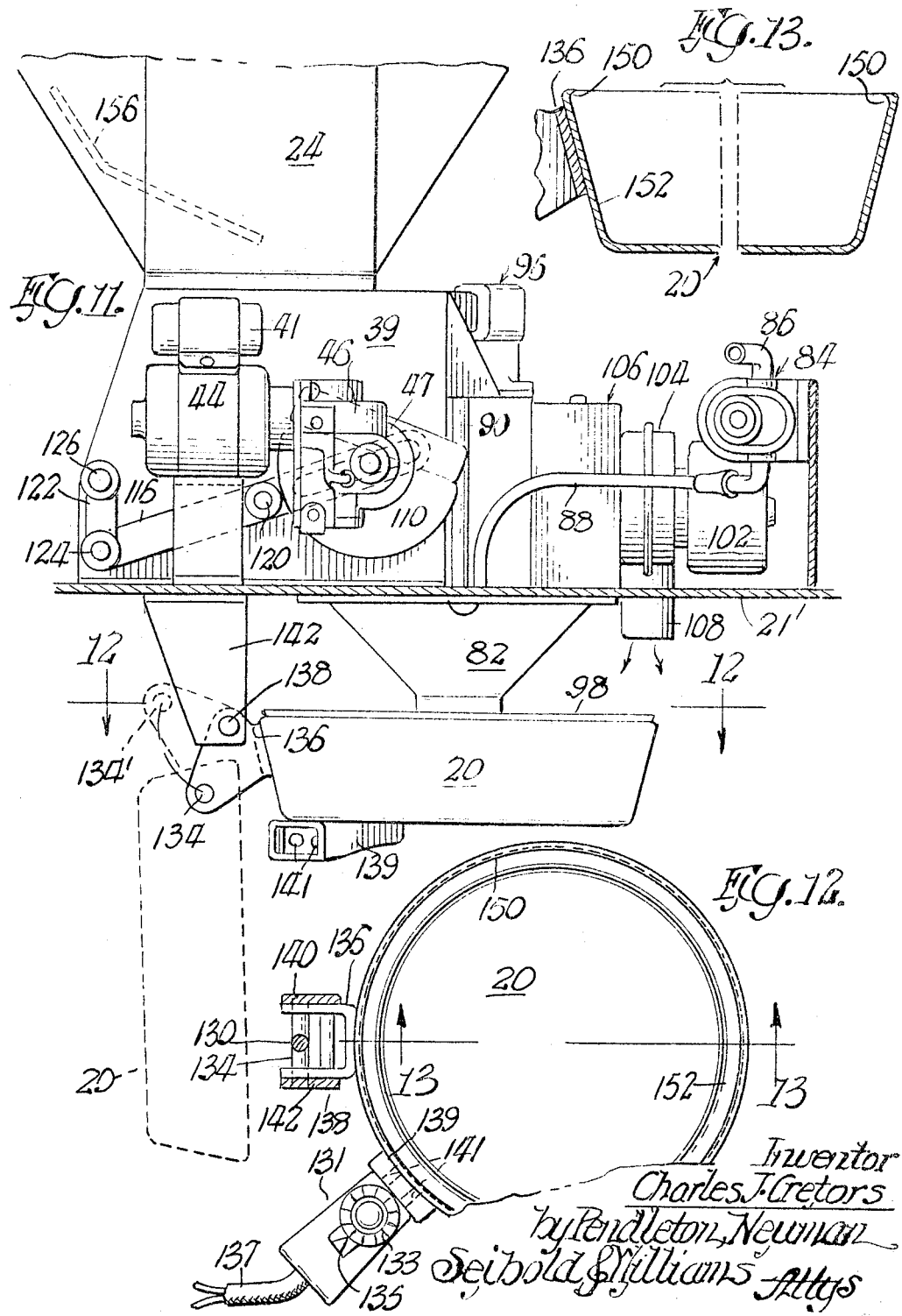

Sept. 13, 1966

C. J. CRETORS 3,272,111

CORN POPPER

Filed May 17, 1963

Inventor
Charles J. Cretors
by Pendleton, Newman
Seibold & Williams Attys

United States Patent Office 3,272,111
Patented Sept. 13, 1966

3,272,111
CORN POPPER
Charles J. Cretors, 1097 Crofton Ave.,
Highland Park, Ill.
Filed May 17, 1963, Ser. No. 281,206
4 Claims. (Cl. 99—238.7)

This invention relates to apparatus for popping popcorn and more particularly to a corn popping machine in which a popping kettle is automatically loaded with corn, cooking oil and salt to begin a popping operation, heated, emptied into a storage chamber after the corn is popped, repositioned, and recharged with corn, oil and salt.

One way in which the prior art automatic corn poppers have proved unsatisfactory relates to the appearance of the popping kettle. In the prior art devices, the mixture of cooking oil and salt within the popping kettle climbs up the side of the kettle by wetting the side of the kettle, and climbs over the rim of the kettle onto the exterior sides of the kettle. This mixture corrodes and darkens the outside of the kettle, giving the same an unappetizing appearance.

It has been found, however, that by putting a lip at the edge of the kettle, this effect can be eliminated.

Another disadvantage of the prior art poppers stems from the vapors that always attend, in some measure, the corn popping process. It has been customary to cause the air within the automatic corn popping machine to be circulated, and passed through a filter in order to eliminate from the air the entrained corn particles, tiny globules of cooking oil, etc., which accompany the vapors. Heretofore, periodic removal of these filters from the corn popper has been required for cleaning. The machine must be stopped and opened to remove a dirty filter and to replace it with a clean one. This operation is undesirable in that an operator's time is required to effect replacement, and if the filter cleaning is not done frequently, the clogged filter is ineffective in removing entrained particles. What is needed, therefore, is a self-cleaning filter.

Accordingly, it is an important object of the present invention to provide a self-cleaning filter for filtering the air within an automatic corn popper.

It is another object of the present invention to provide a self-cleaning filter having a filamentary filter element capable of being heated to a temperature sufficient to burn off the residue which may have collected on the filter, by passing an electrical current through the filamentary filter element.

It is a further object of the present invention to provide an automatic corn popper having a popping kettle provided with a peripheral lip around the rim of the kettle so as to prevent the darkening of the outside walls of the kettle by the mixture of cooking oil and salt.

Other and further objects of the present invention will be apparent to those skilled in the art by reference to the accompanying specification, drawings and the appended claims.

In one embodiment of the present invention, there is provided an automatic corn popper comprising a heated popping kettle in which the corn is popped, a reservoir of cooking oil, a pump operative to transfer a measured quantity of the cooking oil from the oil reservoir to the popping kettle, a hopper for popping corn, and a hopper for salt, and a batch cylinder associated with the hoppers for transferring a measured amount of popcorn and salt to the popping kettle. A motor-driven agitator is provided to maintain the corn being popped in an agitated condition within the popping kettle. A control mechanism including a plurality of cam-operated switches is operative to control various functions of the automatic corn popper, including loading the corn, oil and salt into the popping kettle, and dumping the popped corn into a storage bin. The cams are driven by a motor, which also rotates the batch cylinder, and actuates once each cycle a mechanical linkage mechanism for dumping the contents of the popping kettle into a popcorn storage space. A fan is provided which draws air from within the popping kettle through a self-cleaning filter and then exhausts the air into the popcorn storage bin.

For a more complete understanding of the invention, reference will now be made to the accompanying drawings in which:

FIG. 1 is a front elevation, partially broken away, of an automatic corn popper embodying the present invention;

FIG. 2 is a plan view of a portion of the automatic corn popper of FIG. 1;

FIG. 3 is a vertical section of a portion of the automatic corn popper, taken along the section 3—3 of FIG. 2;

FIG. 4 is a vertical section of a portion of the automatic corn popper, taken along the section 4—4 of FIG. 3;

FIG. 5 is a perspective view of the funnel, kettle lid, and agitator which are illustrated in cross-section in FIG. 3;

FIG. 6 is a vertical section of a portion of the automatic corn popper, taken along the section 6—6 of FIG. 2;

FIG. 7 is a side view, partly in section, of the batch cylinder illustrated in cross-section in FIGS. 3 and 6, taken along the section 7—7 of FIG. 6;

FIG. 8 is a side view of a portion of the dumping mechanism and is taken along section 8—8 of FIG. 6;

FIG. 9 is a plan view of several cams associated with the control mechanism;

FIG. 10 is a perspective view of the measuring cylinder;

FIG. 11 is a side view of the popping kettle and associated equipment;

FIG. 12 is a plan view of the popping kettle, taken along section 12—12 of FIG. 11;

FIG. 13 is a vertical section of the popping kettle, taken along the section 13—13 of FIG. 12;

FIG. 14 is a perspective view of the self-cleaning filter; and

Figure 15:
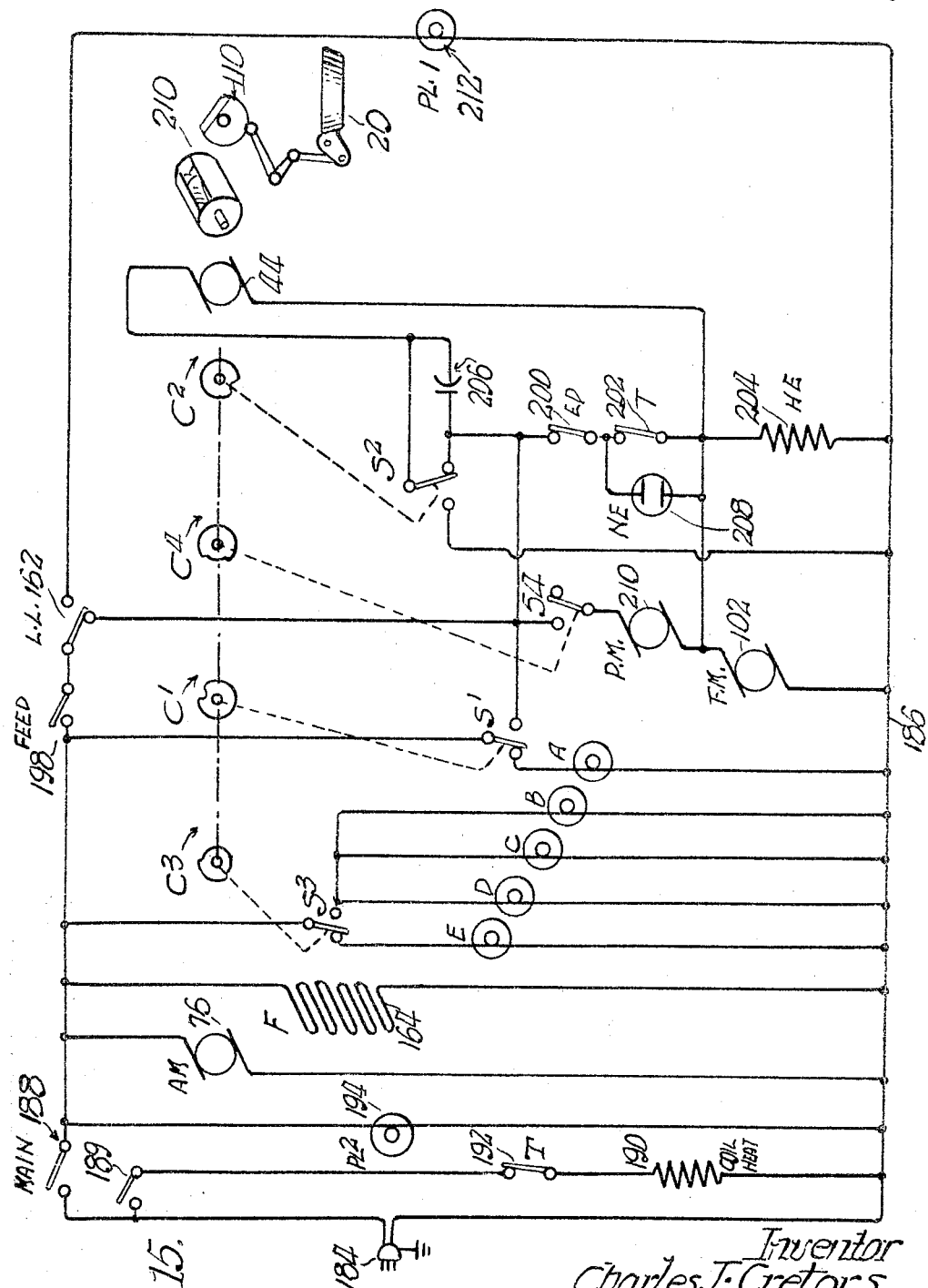
FIG. 15 is a schematic circuit diagram of the control mechanism of apparatus embodying the present invention.

Referring now to FIG. 1, an automatic corn popper is illustrated having a frame comprising vertical side panels 10 and 12, a lid 14, a base 16, and a front panel comprising a transparent glass panel 18, through which the operations of the automatic corn popper may be observed by a spectator. The popping kettle 20 is suspended from a horizontal shelf member 21, secured to the side panels 10 and 12. The popping kettle 20 is visible through the glass panel 18, and a popcorn storage space 22 is located beneath the popping kettle 20 and takes substantially all of the space of a chamber below the popping kettle 20.

At the top of the chamber there is disposed a hopper 24 in which a relatively large amount of popping corn and salt may be stored. The salt is preferably in the form of pellets as described and claimed in my copending application Ser. No. 155,757, filed November 29, 1961, now Patent No. 3,140,952. At the bottom of the chamber is located an oil tank 26 in which a quantity of cooking oil may be stored.

A lamp 28 such as a neon tube or the like is disposed near the front of the chamber, supported on the shelf member 21 by a pair of brackets, and five indicating lights 28 to 32 are suspended from the shelf member 21, near the front of the chamber, together with a panel 34 which may contain advertising matter or the like.

In the operation of the automatic corn popper the popping kettle 20 is periodically loaded with corn and salt from the hopper 24 and cooking oil from the tank 26, after which the corn is popped in the popping kettle 20. After substantially all of the corn is popped, the popping kettle 20 dumps its load of popped corn into the storage space 22.

Referring now to FIGS. 2 to 4 it will be seen that the hopper 24 is adapted to fit into the upper portion of a funnel-like chute defined between sloping front and rear walls 35 and 36, and a pair of vertical side walls 37 and 39 which rest on the shelf member 21. The sloping front and rear walls 35 and 36 are secured to the side walls 37 and 39 by soldering or the like, and an intermediate wall 41 is secured to the front and rear walls 35 and 36 so as to form two spaces within the funnel-like member, communicating with two corresponding chambers within the hopper 24 which are separated by an intermediate wall 43 within the hopper. The front wall 35 terminates above the rear wall 36, to define a slot-like opening 38. Adjacent to the opening 38 is a batch cylinder 40 mounted on a shaft 42 journaled in the side walls 37 and 39 which is rotated by a motor 44 through a shaft 47, a right angle drive 46, and a connecting pin 45. A capacitor 41, for starting the motor 44, is mounted on top of the motor 44.

The batch cylinder 40 is illustrated in perspective in FIG. 10. The cylinder 40 comprises a hollow right circular cylinder, being closed at its ends by end walls 48 and 50. The shaft 42 passes through the center of the cylinder 40, and is in driving engagement therewith by virtue of its square cross section at the end 52 which passes through the end wall 50. A pin 45 detachably connects the shaft 42 to the shaft 47.

An intermediate wall 54 is provided between the end walls 48 and 50, and serves to separate the interior of the batch cylinder 40 into a larger compartment and a smaller compartment. Each of the compartments communicates with a slot having longitudinal edges 56 and 58 in the outside wall of the cylinder 40. The smaller compartment of the cylinder is provided with a false bottom 60 secured to the shaft 40 by a screw 62, and serves to load salt into the popping kettle 20 during a cycle of operation, while the larger compartment loads corn to be popped into the popping kettle. The slot in the batch cylinder 40 registers with the slot 38 of the funnel, and the compartments receive corn and salt, respectively, from the two chambers of the hopper 24, in which a large supply is stored.

Referring again to FIG. 3, it will be evident that when the batch cylinder 40 is in the rotary position illustrated, its compartments are filled with corn and salt respectively. The corn and salt are prevented from falling into popping kettle 20 because of an arcuate portion of the rear wall 36 which closely surrounds a portion of the batch cylinder 40. After the batch cylinder 40 has been loaded, it is rotated in the direction of the arrow in FIG. 3 and dumps both the corn and salt into a chamber 66, defined by a rear wall 68 which is the terminal portion of the rear wall 36, a movable front wall 70, and the side walls 37 and 39.

Referring to FIGS. 6 and 7, it will be seen that a rod 72 is fixed to the shaft 42 and rotates therewith. At its outer end the rod 72 is bent outwardly from the cylinder in a direction parallel to the axis of the shaft 42 to form a finger 74, which is adapted to engage a lever 76. The lever 76 is connected to a shaft 78 which in turn is secured to the movable front wall 70 of the compartments 66 into which the corn and salt are dumped from the batch cylinder 40. A spring 80 is connected to the lever 76 to urge it into its most counterclockwise position as shown in FIG. 7 (clockwise as shown in FIG. 3), to maintain the movable wall 70 normally closed against the vertical wall 68 of the chamber 66. After the finger 74 first touches the lever 76, approximately 45° of rotation of the shaft 42 is required to open the movable wall 70 completely, after which the finger 74 rides over the end of the lever 66, and the spring 80 snaps the wall 70 shut.

When the rotation of the cylinder 40 is sufficient, the finger 74 engages and operates the lever 76, and the movable front wall 70 is swung away from the rear wall 68 to the position shown in phantom 70' in FIGS. 3 and 7. When the movable wall 70 swings open, the corn and salt are discharged from the compartment 66 through a funnel 82 into the popping kettle 20.

At the same time as the corn and salt are dumped into the popping kettle 20, cooking oil is also pumped into popping kettle 20 by a pump 84 from the tank 26 through an intake line 86 to the pump 84, and from there through an outlet 88 to the interior of the funnel 82 and into the popping kettle 20. The pump 84 is powered by a pump motor 210, mounted on the shelf member 21.

In FIG. 3, the popping kettle is illustrated in its upper position which is assumed by the popping kettle 20 when it is being loaded with oil, corn and salt preparatory to the popping of the corn.

It will be seen from FIG. 3 that the oil, corn and salt are all introduced into the popping kettle 20 at the center portion thereof, at which the narrow portion of the funnel opens.

Concentric with the funnel 82 is a shaft 90 connected at its bottom end to a fitting 92 to which are connected a pair of agitator rods 94, disposed adjacent to the bottom of the popping kettle 20. At the upper end of the shaft 90 is a motor 96 which rotates the shaft 90 and the agitator rods 94 to maintain the corn, salt and cooking oil in constant agitation so as to ensure complete popping of the corn without burning.

The bottom of the funnel 82 opens just above the bottom of the popping kettle 20, so that only the bottommost kernels of the corn to be popped are in contact with the bottom of the popping kettle 20. The rotation of the agitator rods 92, however, imparts a centrifugal force to the kernels of corn, moving them outwardly from the center of the popping kettle 20 into the chamber 96 which is defined by the bottom portion of the funnel 82, the bottom and side walls of the popping kettle 20, and a conical shaped lid 98 which is slidably mounted on the bottom portion of the funnel and supported by an O ring 100, disposed in an annular groove in the bottom portion of the funnel 82.

When the corn is moved from the funnel 82 into the chamber 96 by the rotation of the agitator rods 94, it pops in the chamber 96. When a sufficient number of kernels of corn have popped, the pressure of the popped corn within the chamber 96 forces the lid 98 upwardly along the bottom portion of the funnel 82, and spills out over the edges of the kettle 20 into the popcorn storage space 22.

A motor 102 drives a fan 104 which pulls air from the interior of the upper portion of the funnel 82 through a filter unit 106, and then exhausts the air through an exhaust nozzle 108 into the popcorn storage space 22. The operation of the fan 104 creates a low pressure area within the funnel 82, which causes a small quantity of air to be sucked into the chamber 96 from between the side walls of the kettle 20 and the lid 98. This air is heated, both by being drawn through the popping chamber, and being passed through the filter 106, so that it serves to keep the popcorn stored in the popcorn storage space 22 at a warm temperature.

A gap 180 is provided, between the filter 106 and the fan 104, which is open to the atmosphere. Accordingly, the fan 104 draws air through the gap 180, from the upper portion of the popper and exhausts it into the popcorn storage space 22, to remove heat from the vicinity of the popcorn storage hopper 24, thereby to prevent the popcorn in the hopper 24 from drying out.

Referring to FIGS. 2 and 6, it will be seen that a cam 110 is also connected to the shaft 47 for rotation therewith. The cam 110 is shown in detail in FIG. 8, and has a surface 112 concentric with the axis of the shaft 142 and another surface 114 which is not concentric, but rather consists of a flat portion 114a and two additional portions 114b joining the flat portion 114a to the concentric portion 112. A cam follower in the form of an elongated link 116 is provided which link has a slot 118 near its end. The shaft 47 passes through the slot 118 and permits the link 116 to have a radially shifting movement, and to rotate about the shaft 47. The link 116 is provided with a roller 120, rotatably mounted on a shaft 121 fixed to the link 116, which roller 120 cooperates with the surfaces 112 and 114 of the cam 110 in order to cause the link 116 to move longitudinally and radially with respect to the shaft 47. The link 116 is pivotally connected to a link 122 by a pivot connection 124. The link 122 is fixed to a shaft 126 which is journaled between the side walls 37 and 39 (FIG. 4). The cam 110 is also equipped with a flange 114c, parallel to the flat portion 114a of the cam. The flange 114c traps the roller 120 and holds it against the flat portion 114a during each revolution of the cam 110.

Referring again to FIG. 3, the shaft 126 is fixed to a second link 128 which is pivotally connected to an actuator rod 130 by a pivot connection 132. The actuator rod 130 is secured to a shaft 134 (FIG. 12) which is rotatably mounted in a bracket 136 welded or otherwise fixed to a side wall of the popping kettle 20. A shaft 138 is journaled for rotation in the bracket 136, and the shaft 138 is fixed to a pair of braces 140 and 142 which are welded or otherwise rigidly attached to the shelf member 21. Thus the position of the shaft 138 is fixed while that of the shaft 134 is dependent upon the rotary position of the cam 110. In FIG. 11, the full line position of the kettle 20 is achieved when the cam follower rim 116 has its roller 120 bearing on the concentric portion of the cam 110. When the cam 110 rotates to a position where the roller 120 bears against the flat portion 114a of the cam surface, the cam follower link 116 moves radially inward with respect to the shaft 47, acting through the link 122 to rotate shaft 126 counterclockwise as viewed in FIG. 11. The counterclockwise movement of the shaft 126 causes the actuator rod 130 (FIG. 3) to be moved upwardly, thus dropping the position of the kettle 20 to that shown in phantom form in FIG. 18, and thereby dumping the contents of the kettle 20. As the cam 110 continues to rotate, the kettle 20 is raised back to its popping position. Approximately 165° of rotation of the cam 110 is required to move the kettle 20 to dumping position and return.

Referring now particularly to FIGS. 11 and 12, where the popping kettle is illustrated, it will be seen that the popping kettle 20 includes a circular electric frying pan having a handle 131 which contains a dial 133 and an index mark 135 for setting the desired temperature of the frying pan. The frying pan is preferably a conventional frying pan, and has a heating element in the bottom thereof (not shown) and a thermostat operative to selectively energize the heating element in order to maintain the temperature of the frying pan at the temperature set by the dial 133 and index mark 135. As is well-known in the operation of thermostats, the temperature of the frying pan or popping kettle 20 is controlled within two predetermined temperature limits, the heating element of the frying pan being energized when the lower temperature limit is reached and being de-energized when the upper temperature limit is reached.

The handle 131 is provided with an electrical plug which fits into a socket 139 at the base of the popping kettle 20. A pair of receptacles 141 cooperate with a corresponding pair of connectors in the handle 131 to establish electrical contact between the electrical components within the base of the popping kettle 20 and those within the handle 131. The wires by which the thermostat and heating element are connected to a source of power are contained in the cable 137, connected to the handle 131.

The cable 137 is a flexible cable and the wires contained therein are braided so that the cable and wires can easily bend when the popping kettle 20 is dumped by being moved to the phantom position indicated in FIG. 11.

FIG. 13 is a vertical cross section of the popping kettle and particularly illustrates the lip 150 which is integral with the upper inside edge of the side wall 152 of the popping kettle 20. The lip 150 extends entirely around the interior surface of the side wall 152, closing upon itself, and is in the form of a sharp edge projection extending inwardly from the side wall 152 for about 1/64" to 1/32". The lip is preferably formed by burring the upper inside edge of the side wall 150.

The purpose of the lip 150 is to substantially prevent the outside of the popping kettle 20 from becoming encrusted with a residue of cooking oil and salt. The salt tends to climb up the side walls of the popping kettle 20, but the lip 150 interferes with its travel over the rim of the popping kettle 20. When the salt reaches the lip 150, most of it either falls off back into the popping kettle 20, or is wiped off by the corn popping inside the kettle 20.

In FIG. 11, there is illustrated a level detector comprising a member 156 which is hingedly mounted to the upper portion of the hopper 24 by means not shown. A "low level" switch is actuated by movement of the member 156, in a manner well-known to those skilled in the art, such that when the hopper 24 is full of corn to be popped, the switch is open. When the level of the corn reaches a predetermined value, however, the switch is closed to indicate an exhausted supply of corn to be popped, which inhibits the further operation of the corn popper in a manner which will hereinafter be described.

Referring now to FIGS. 2, 3 and 14, the filter 106 contains a filter element 164 comprising a fine wire wrapped many times about a pair of insulating spacer members 166 and 168. The two ends of the wire forming the filter element 164 are connected to terminals 170 and 172 at the top of the filter 106, and are adapted to be connected to a source of electrical voltage, whereby the filter element 164 is heated by current flowing therethrough. The filter 106 is a self-cleaning filter, and any foreign matter collected on the filter element 164 is periodically burnt off and vaporized and, therefore, does not clog the operation of the filter. The burnt and vaporized foreign matter escapes through the gap 180 between the filter 106 and the fan 104. The spacing between successive turns of the wire making up the filter element 164 is very small so that substantially all of the foreign matter present in the air drawn through the filter is caught in the filter.

The filter 106 is supported in a casing 174 which is fixed to the shelf member 21 of the popping apparatus and the filter 106 is held in the case 174 by a pair of tracks 176 and 178, so that it may be withdrawn and inspected from time to time, or replace the filter element 164 when necessary. It will be appreciated, however, that the filter 164 need be inspected only rarely, due to its self-cleaning feature. The use of this filter, therefore, eliminates the necessity of having to inspect and clean the filter at frequent intervals.

A leaf spring 182 is fixed to the housing of the filter and forces the lower insulating spacer member 168 in a downward direction as viewed in FIG. 14 to maintain the wires of the filter element 164 in sufficient tension to keep them straight.

Referring now to FIG. 15, there is shown a schematic circuit diagram of the circuit by which the operation of the corn popper is controlled, all of the switches being illustrated in their normal condition prior to initiating the operation of the popper. A plug 184 is connected to a source of power, and the terminals of the plug 184 are connected respectively to a common line 186 and to a terminal of the main switch 188.

A second switch 189, independent of the main switch 188, controls an oil heating element 190 through a thermostatic element 192 to heat the oil in the tank 26 (FIG.

1) to a sufficiently high temperature so that the oil flows freely into the popping kettle. The actuation temperature of the thermostat 192 is set so as to maintain the temperature of the oil substantially constant at this value. Both the heating element 190 and the thermostatic element 192 are disposed within the oil tank 26. When the room temperature is high enough to render the oil liquid, however, the switch 189 may be left open.

A pilot light 194 is energized on the closing of the main switch 188 to indicate to an operator that the main switch is closed, and an agitator motor 76 is energized for continuously rotating the agitator rods 94 (FIG. 3). A current also flows through the filter element 164, to burn off any corn husks or other residue which may be present on the filter element. The switch S3 closes a circuit through an indicator lamp E, indicating that the apparatus is ready to have a cycle started.

The condition of the apparatus remains as described until a feed switch 198 is closed by an operator. The closing of the feed switch 198 closes a circuit from the main switch 188 through the "low level" switch 162 and an "emergency dump" switch 200, and a thermostatically controlled switch 202 to a heating element 204 for the popping kettle 20. The fan motor 102, which is connected in parallel with the heating element 204, is also energized at this time. The heating element 204 operates to heat the kettle up to the popping temperature, and when this temperature is reached, the thermostatic switch 202 opens. The opening of the thermostatic switch 202 permits current to flow through the dump motor 44, which is connected in parallel with the switch 202. A neon lamp 208, also in parallel with the switch 202, indicates that the latter is open.

Four cams indicated in FIG. 15 as C1, C2, C3, and C4 are connected to the shaft of the motor 44, and begin to rotate when the motor 208 is energized. The contour of these cams is illustrated in FIG. 9. The batch cylinder 40 is also connected to the shaft 47 of the motor 44, and therefore also begins to rotate when the motor 44 is energized. The motor 44 makes one complete revolution for each corn popping cycle of the machine and for convenience, the various portions of the cycle of such machine will be referred to in terms of the angular position of the shaft 47. The position of the shaft 47 at the time the motor 44 is energized will be referred to arbitrarily as 0°, and it will be appreciated from the description which follows that the angular position of the shaft 47 is the same at the 0° point of each cycle of operation.

At about 30°, the cam C1 switches the switch S1, thereby disconnecting the circuit including the indicator lamp A, and closing a circuit in parallel with the feed switch 198 and the "low level" switch 162. As the feed switch 198 has been closed, no change in the condition of the circuit occurs at this time, other than the disconnection of the indicator lamp A, and the motor 44 continues to rotate, and the batch cylinder 40 loads a charge of corn and salt into the chamber 66 during the period from about 30° to 60°.

Also at about 30°, the cam C4 closes the switch S4, thereby completing an electrical circuit through the pump motor 210, in parallel with the motor 44. The motor 210 thereupon begins to pump oil into the popping kettle 20. At the same time, the loading arm 76 is tripped by the finger 74 and the rod 72 to dump the corn and salt into the popping kettle from the chamber 66.

At about 60°, the cam C4 opens the switch S4, de-energizing the pump motor 210.

Also at about 60°, the cam C3 closes the switch S3, thereby de-energizing the indicator lamp E, and instead energizing the lamps B, C, and D, to indicate that corn, oil and salt have been loaded, and that the corn is now popping.

As above described, approximately 45° of rotation of the motor shaft is required to cause the loading bin to discharge its contents into the popping kettle. At about 75°, the finger 74 is released and the movable front wall 70 closes, preparatory to loading the chamber 66 from the hopper for the next cycle of operation.

At about the 165° point, the cam C2 switches the position of the switch S2, de-energizing the dump motor 44. This condition of the circuit is maintained until the temperature of the popping kettle cools sufficiently to enable the thermostatic switch 202 to close, which cooling occurs quickly because of the cooling effect on the popping kettle 20 of the new charge of corn, oil and salt. The closing of the thermostatic switch 202 energizes the heater 204, the fan motor 102, and the dump motor 44. The dump motor 44 rotates to about the 180° point, at which time the cam C2 switches the switch S2 back to its right-hand position as illustrated in FIG. 15. This de-energizes the motor 44 which is now connected across the closed thermostatic switch 202. A capacitor 206 is connected across two of the terminals of the switch S2 to reduce arcing at the contacts.

During the time that the thermostatic switch 202 is closed, the heating element 204 receives current through the thermostatic switch 202, serving to heat the popping kettle, and the corn in the kettle is caused to pop. When substantially all of the corn in the kettle is popped, the popping kettle reaches the temperature which causes the thermostatic switch 202 to open. The opening of the switch 202 places the motor 44 in series with the parallel circuit including the fan motor 102 and the heating element 204. Since the heating element 204 has a lower impedance than either of the motors 44 and 102, most of the voltage appears across the motor 44, and the heater 204 and the fan motor 102 are effectively de-energized. The energization of the motor 44 continues the rotation of the shaft 47, which causes the popping kettle to be dumped through the cam and lever connections illustrated in FIG. 3. As has been noted above, the dumping of the popping kettle requires approximately 165° of rotation of the shaft 47, which takes place between 195° and 360° of the operation cycle. In the meantime at about 255°, however, the cam C3 switches the switch S3 back to its left-hand position as illustrated in FIG. 15, to de-energize the indicator lights B, C and D, and to energize the indicator light E, indicating that fresh popped corn is ready. At 360° the dumping operation of the popping kettle is complete, and the kettle has returned to its upper position against the lid 82 preparatory to a further popping cycle. At this time the cam C1 switches the switch S1, to connect the indicator lamp A in circuit as illustrated in FIG. 15, indicating that the apparatus is ready to begin another cycle.

The further operation of the control circuit at this time depends upon the condition of the feed switch 198 and the "low level" switch 162. If both switches remain closed, the control circuit will continue through an additional cycle in which the shaft of the dump motor 208 is rotated another 360°. Successive cycles of operation differ from the initial cycle of operation in that the temperature of the popping kettle is sufficiently high to cause the thermostatically controlled switch 202 to be opened at the beginning or 0° point of the cycle. Thus, the dump motor 44 continues to rotate to the 30° point, at which the cam C1 switches the switch S1 to its right-hand position, short circuiting the feed switch 198.

If the feed switch 198 is open at the 360° point, however, the dump motor 208 is de-energized when the cam C1 returns the switch S1 to its left-hand position as illustrated in FIG. 15, and no further operations are performed by the control circuit of FIG. 15. It will be appreciated from the above description that the feed switch 198 may be opened at any time during the cycle of operation, and that cycle of operation will be completed before the operation of the mechanism is halted.

Similarly, when the "low level" switch 162 is open, indicating an exhausted corn supply, the operation is halted at the 360° point, and the pilot lamp 212 is lit to indicate this condition to the operator. The opening of the "low level" switch 162, like the feed switch 198, permits the execution of the cycle in which the switch is opened, so that a succeeding cycle is always initiated at the 0° point.

The switch 200 is an "emergency dump" switch which, if opened during the popping cycle, operates to energize the dump motor 44 to dump the contents of the popping kettle 20. This is a safety provision, which may be used when some malfunction develops in the popping kettle 20 or its thermostatic switch 202, etc.

It will be noted that during a cycle of operation, the fan motor 102 is sometimes on and sometimes off. It is on during the warp-up period of the initial cycle, and during the popping portions of subsequent cycles. The remainder of the time, however, it is off. While the fan motor 102 is off, the filter element 164 of the filter 106 gets sufficiently hot to burn off residue. While the fan is on, however, the flow of air through the filter 106 serves to maintain the filter element 164 cool in order to prolong its life. The hot periods of the filter 106 during each cycle are sufficient to keep it clean.

The foregoing has so completely and fully described the present invention that those skilled in the art will be able to make and use the same. It should be evident, however, that certain modifications and changes may be made in the embodiments illustrated and described while retaining the essential features of what may be said to constitute the essential items of novelty involved, which are intended to be defined and secured by the following claims.

What is claimed is:

1. In a corn popper, a corn popping chamber, means for withdrawing air from said chamber at a predetermined rate, a passageway interconnecting said chamber and said withdrawing means, a filter element disposed in said passageway for straining foreign matter from said air, means for heating said filter element to a temperature at which said foreign matter will be volatilized when said air is moving at substantially less than said predetermined rate, and by-pass means in said passageway to by-pass the volatilized foreign matter from said passageway.

2. The corn popper of claim 1 wherein a passageway is provided between the output of said withdrawing means and said chamber.

3. The corn popper of claim 2 wherein said means for heating is continuously energized and said withdrawing means is only periodically energized during a corn popping cycle whereby warm air is normally returned to said chamber.

4. In a corn popper, a corn popping chamber, means for withdrawing air from said chamber at a predetermined rate, a passageway interconnecting said chamber and said withdrawing means, a filter element disposed in said passageway for straining foreign matter from said air, means for heating said filter element to a temperature at which said foreign matter will be volatilized when said air is moving at substantially less than said predetermined rate, and control means to continuously energize said means for heating during a corn popping cycle and periodically energizing said withdrawing means during said cycle.

References Cited by the Examiner
UNITED STATES PATENTS

| | | | |
|---|---|---|---|
| 1,211,973 | 1/1917 | Slater et al. | 219—371 |
| 1,332,023 | 2/1920 | Booth | 99—238.6 X |
| 1,759,589 | 5/1930 | Peters | 126—385 |
| 1,968,786 | 7/1934 | Schultz | 126—385 |
| 2,202,258 | 5/1940 | Lynch | 55—282 |
| 2,493,356 | 1/1950 | Mercier et al. | 55—282 |
| 2,496,199 | 1/1950 | Bushway | 99—238.5 X |
| 2,766,439 | 10/1956 | Palm | 340—222 |
| 2,771,836 | 11/1956 | Denehie et al. | 99—238.5 X |
| 2,799,847 | 7/1957 | Harris | 340—222 |
| 2,829,735 | 4/1958 | Kroll | 55—304 X |
| 2,853,368 | 9/1958 | Adey | 338—304 X |
| 3,069,785 | 12/1962 | Mitter et al. | 55—282 X |

WALTER A. SCHEEL, *Primary Examiner.*

JEROME SCHNALL, *Examiner.*

EMANUAL HOROWITZ, CLYDE I. COUGHENOUR,
*Assistant Examiners.*